(12) United States Patent
Peh et al.

(10) Patent No.: US 11,630,727 B2
(45) Date of Patent: Apr. 18, 2023

(54) GENERATING DIE BLOCK MAPPING AFTER DETECTED FAILURE

(71) Applicant: Micron Technology, Inc., Boise, ID (US)

(72) Inventors: Woei Chen Peh, Singapore (SG); Xiaoxin Zou, Singapore (SG); Chandra Mouli Guda, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/211,601

(22) Filed: Mar. 24, 2021

(65) Prior Publication Data

US 2022/0308958 A1    Sep. 29, 2022

(51) Int. Cl.
| | |
|---|---|
| *G06F 11/30* | (2006.01) |
| *G06F 11/10* | (2006.01) |
| *G06F 11/07* | (2006.01) |
| *G06F 12/0891* | (2016.01) |
| *G06F 12/02* | (2006.01) |
| *G06F 12/0804* | (2016.01) |

(52) U.S. Cl.
CPC ...... *G06F 11/1068* (2013.01); *G06F 11/0772* (2013.01); *G06F 11/3037* (2013.01); *G06F 12/0246* (2013.01); *G06F 12/0804* (2013.01); *G06F 12/0891* (2013.01)

(58) Field of Classification Search
CPC ............. G06F 11/1068; G06F 11/0772; G06F 11/3037; G06F 12/0246; G06F 12/0804; G06F 12/0891; Y02D 10/00
USPC .......................................................... 714/773
See application file for complete search history.

(56) References Cited

U.S. PATENT DOCUMENTS

| | | | |
|---|---|---|---|
| 8,583,989 B2* | 11/2013 | Bubb | G06F 13/387 714/763 |
| 11,221,961 B1* | 1/2022 | Lercari | G06F 3/064 |
| 2012/0272123 A1* | 10/2012 | Yeh | G06F 11/1044 711/E12.008 |
| 2014/0157085 A1* | 6/2014 | Shalvi | G06F 12/023 714/768 |
| 2014/0310576 A1* | 10/2014 | Asano | G11C 29/52 714/773 |
| 2015/0135039 A1* | 5/2015 | Mekhanik | G11C 11/5628 365/185.02 |
| 2018/0150255 A1* | 5/2018 | Woo | G06F 11/1048 |
| 2020/0057562 A1* | 2/2020 | Lee | G06F 12/0246 |
| 2020/0081833 A1* | 3/2020 | Lee | G06F 12/10 |

* cited by examiner

*Primary Examiner* — Albert Decady
*Assistant Examiner* — Enam Ahmed
(74) *Attorney, Agent, or Firm* — Schwegman Lundberg & Woessner, P.A.

(57) ABSTRACT

A memory device includes a plurality of memory die blocks and a plurality of memory channels operably coupled to the plurality of memory die blocks and a memory controller configured to identify one or more memory die blocks as being invalid. The memory controller obtains a first matrix storing a mapping of memory channels to memory die blocks and creates a new mapping of memory channels to memory die blocks excluding the invalid memory die blocks. The new mapping is stored in a second matrix and one or more operations are performed on the memory die blocks based on the new mapping.

20 Claims, 12 Drawing Sheets

| CH0 | 6 | 5 | 5 | 5 | 4 | 4 | 3 | 3 | 3 | 2 | 2 | 1 | 1 | 0 | 0 |
|-----|---|---|---|---|---|---|---|---|---|---|---|---|---|---|---|
| CH1 | 6 | 5 | 5 | 4 | 4 | 4 | 3 | 3 | 3 | 2 | 2 | 1 | 1 | 1 | 0 |
| CH2 | 2 | 2 | 2 | 2 | 2 | 2 | 1 | 1 | 1 | 0 | 1 | 0 | 0 | 0 | 0 |
| CH3 | 3 | 3 | 2 | 2 | 2 | 2 | 1 | 1 | 1 | 1 | 1 | 1 | 0 | 0 | 0 |

400 — 402

| CH0 | 1/6 | 1/6 | 1/5 | NA  | 1/5 | 1/4 | NA  | 1/3 | 1/3 | 1/2 | 1/2 | NA  | 1   | NA       | UNAVAIL |
|-----|-----|-----|-----|-----|-----|-----|-----|-----|-----|-----|-----|-----|-----|----------|---------|
| CH1 | 1/6 | NA  | 1/5 | 1/5 | 1/4 | 1/4 | 1/3 | 1/3 | NA  | 1/2 | 1/2 | NA  | NA  | 1        | NA      |
| CH2 | 1/2 | 1/2 | 1/2 | 1/2 | 1/2 | 1/2 | 1   | 1   | 1   | NA  | 1   | NA  | NA  | UNAVAIL  | UNAVAIL |
| CH3 | 1/3 | 1/3 | 1/2 | 1/2 | 1/2 | 1/2 | 1   | 1   | 1   | 1   | 1   | 1   | NA  | UNAVAIL  | UNAVAIL |

| STEP 1 | Channel | 0 | 1 | 3 | 0 | 1 | 2 | 0 | 1 | 3 |
|---|---|---|---|---|---|---|---|---|---|---|
|  | CE | 0 |  | 1 |  |  | 2 |  |  |

| STEP 2 | Channel | 0 | 1 | 3 | 0 | 1 | 2 | 0 | 1 | 3 |
|---|---|---|---|---|---|---|---|---|---|---|
|  | CE | 0 | 0 |  | 1 | 1 |  | 2 | 2 |  |

| STEP 3 | Channel | 0 | 1 | 3 | 0 | 1 | 2 | 0 | 1 | 3 |
|---|---|---|---|---|---|---|---|---|---|---|
|  | CE | 0 | 0 | 0 | 1 | 1 |  | 2 | 2 | 1 |

| STEP 4 | Channel | 0 | 1 | 3 | 0 | 1 | 2 | 0 | 1 | 3 |
|---|---|---|---|---|---|---|---|---|---|---|
|  | CE | 0 | 0 | 0 | 1 | 1 | 0 | 2 | 2 | 1 |

STEP 1

| Channel | 0 | 1 | 3 | 0 | 1 | 2 | 0 | 1 | 3 |
|---------|---|---|---|---|---|---|---|---|---|
| CE      | 0 | 0 | 0 | 1 | 1 | 0 | 2 | 2 | 1 |
| LUN     | 0 |   |   | 0 |   |   | 0 |   |   |

STEP 2

| Channel | 0 | 1 | 3 | 0 | 1 | 2 | 0 | 1 | 3 |
|---------|---|---|---|---|---|---|---|---|---|
| CE      | 0 | 0 | 0 | 1 | 1 | 0 | 2 | 2 | 1 |
| LUN     | 0 | 0 | 0 | 0 | 0 |   | 0 | 0 |   |

STEP 3

| Channel | 0 | 1 | 3 | 0 | 1 | 2 | 0 | 1 | 3 |
|---------|---|---|---|---|---|---|---|---|---|
| CE      | 0 | 0 | 0 | 1 | 1 | 0 | 2 | 2 | 1 |
| LUN     | 0 | 0 | 0 | 0 | 0 | 0 | 0 | 0 | 0 |

STEP 4

| Channel | 0 | 1 | 3 | 0 | 1 | 2 | 0 | 1 | 3 |
|---------|---|---|---|---|---|---|---|---|---|
| CE      | 0 | 0 | 0 | 1 | 1 | 0 | 2 | 2 | 1 |
| LUN     | 0 | 0 | 0 | 0 | 0 | 0 | 0 | 0 | 0 |

*FIG. 4C*

GENERATING DIE BLOCK MAPPING AFTER DETECTED FAILURE

TECHNICAL FIELD

Embodiments of the disclosure relate generally to memory sub-systems, and more specifically, relate to generating a die block mapping after detecting a failure of a die block, which can be part of a memory sub-system.

BACKGROUND

The memory sub-system can include one or more memory components that store data. The memory devices can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and front the accompanying drawings of various embodiments of the disclosure. The drawings, however, should not be taken to limit the disclosure to the specific embodiments, but are for explanation and understanding only.

FIGS. 4A-4E illustrates an example method of generating a die block mapping after a detected failure in accordance device in accordance with some embodiments of the present disclosure.

DETAILED DESCRIPTION

Figure 1:
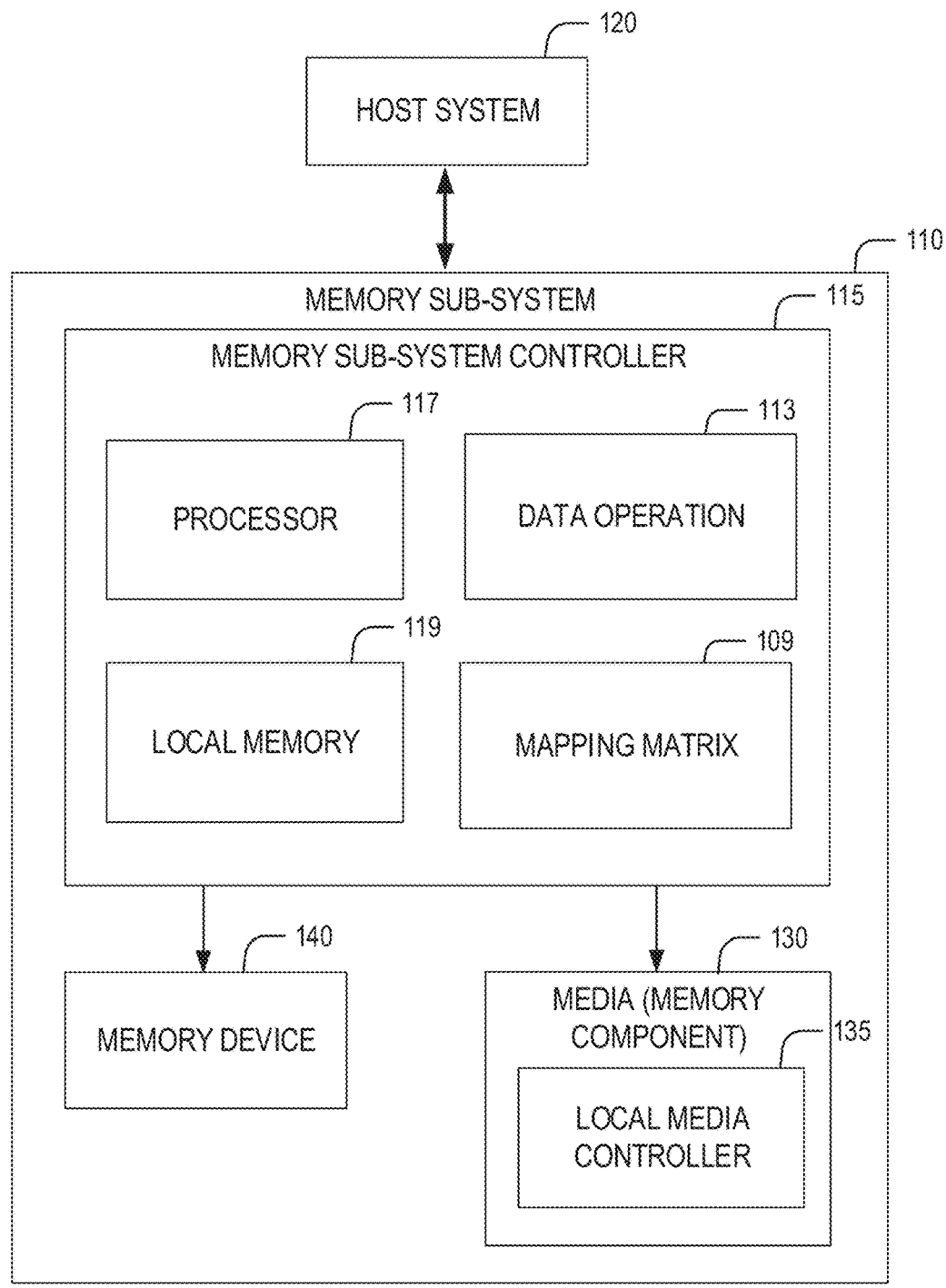
FIG. 1 illustrates an example computing environment that includes a memory sub-system in accordance with some embodiments of the present disclosure.

Aspects of the present disclosure are directed to generating die block mapping after detected failures on a memory device, which can be part of a memory sub-system, where the operations can enable the memory device to maintain optimal operations when one or more die blocks are detected as being invalid, corrupt, or otherwise offline. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory device can be a non-volatile memory device. One example of a non-volatile memory device is a negative-and (NAND) memory device. Other examples of non-volatile memory devices are described below in conjunction with FIG. 1. Some memory devices, such as NAND memory devices, include an array of memory cells (e.g., flash cells) to store data. Each cell includes a transistor, and within each cell, data is stored as the threshold voltage of the transistor, based on the logical value of the cell (e.g., 0 or 1). Memory cells in these devices can be grouped as pages that can refer to a logical unit of the memory device used to store data. For example, memory cells in NAND memory devices are connected horizontally at their control gates to a word line to form a page. With some types of memory devices (e.g., NAND), pages are grouped to form blocks (also referred to herein as "memory blocks").

The host system can send access requests (e.g., write command, read command) to the memory sub-system, such as to store data on a memory device at the memory sub-system, read data from the memory device on the memory sub-system, or read/write constructs with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can include error handling data (e.g., error-correcting code (ECC) codeword, parity code), data version (e.g., used to distinguish age of data written), valid bitmap (which LBAs or logical transfer units contain valid data), and so forth.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The memory sub-system can initiate media management operations, such as a write operation, on host data that is stored on a memory device. For example, firmware of the memory sub-system can re-write previously written host data from a location of a memory device to a new location as part of garbage collection management operations. The data that is re-written, for example, as initiated by firmware, is hereinafter referred to as "garbage collection data."

"User data" hereinafter generally refers to host data and garbage collection data. "System data" hereinafter refers to data that is created and/or maintained by the memory sub-system for performing operations in response to host request and for media management. Examples of system data include, and are not limited to, system tables (e.g., logical-to-physical memory address mapping table (also referred to herein as a L2P table)), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest areas that can be erased. Each block is comprised of a set of pages. Each page is comprised of a set of memory cells, which store bits of data. The memory devices can be raw memory devices (e.g., NAND) which are managed externally, for example, by an external controller. The memory devices can be managed memory devices (e.g., managed NAND), which are a raw memory device combined with a local embedded controller for memory management within the same device package.

A traditional computer system, such as a conventional supercomputer, has "burned-in" memory allocations at the time of manufacturing. However, such a static memory allocation is not suited for adaptation after memory die block failures and resulting issues including memory channel collisions and data degradation can occur. The system can additionally encounter errors such as a bus contention error when the processor of the computer system attempts to access a memory location that does not exist or does not, respond properly. Conventional memory systems include NAND devices comprised of any number of total die blocks across any number of channels. This configuration is caused as a result of various NAND materials and package configurations subject to device design specifications, requirements, and budget constraints.

Generally, each solid-state device (SSD) can be created by any number of DIE blocks across any number of memory channels. This is seen typically as the selection of different NAND material produced by various manufacturers are packaged together. In one example, a 64-layer TCL NAND device includes 6 die blocks of 48 GB each to create 256 GB. In another example, a 96 layer TLC NAND device includes 4 die blocks of 64 GB to create 256 GB device. In a third example, a 96 layer TLC NAND device may include 6 die blocks of 64 GB to create 240 GB and 9 DIE blocks to create 480 GB. There are numerous configurations of NAND devices based on various sized die blocks.

To control operations on the NAND device, the memory controller uses memory channels to communicate with the die blocks. In some NAND devices, the memory controller has 4 memory channels with up to 16 chip enable (CE) lines. Each memory die block connected to a memory channel has its own CE signal which selects the particular die block that the controller is communicating with. On the channel, the bus broadcasts the address, data, and flash commands to all die blocks within the channel but only to the die block whose CE signal is active will read the information from the bus and execute the corresponding operation. To that end, each die block is addressed both a channel and a CE line.

Traditionally, the die mapping is statically defined and stored in the firmware of the memory controller. The die mapping is typically burned in or preset before shipment to the customer and is not upgradable or replaceable. Additionally, static die mapping has performance and degradation issues in the event of DIE block recovery failures. The performance and degradation issues are likely caused by channel collision after repeated issuance of memory commands to die blocks using the same channel. However, it is difficult to determine a die mapping using a brute force approach. In a typical NAND device with over 100 die blocks, there be countless possible unique die mappings. Further, it is impracticable to store all possible die mappings on the drive itself. In instances of die failure, a static die mapping is undesirable as it could cause and result in LUN degradation.

Instead, a method and corresponding system considers a dynamic die mapping to improve the die mapping even in occurrences of detected die block failures. The improved die mapping extends the lifetime of the SSD, increases performance, and overall quality of the device.

The improved mapping accounts for the physical position information to determine an improved mapping solution to avoid performance degradation. Typically, when a die block becomes retired or goes offline for any of a various set of reasons, the data cursor of the flash translation layer (FTL) firmware simply skips over the retired/offline die block. This situation can create problems for sequential write and/or read operations in terms of both bandwidth and quality of service (QoS).

Aspects of the present disclosure address the above and other issues by having a memory sub-system for generating die block mapping after detected failure of memory die blocks. In particular, various embodiments enable "on-the-fly" optimization mapping of die blocks to effectively circumvent channel collision issues and thereby improving bandwidth, performance, and longevity of the memory device itself.

Though various embodiments are described herein with respect to a memory sub-system controller, some embodiments implement features described herein (e.g., operations for generating a new mapping) as part of a memory device (e.g., a controller, processor, or state machine of a memory die). For instance, various embodiments implement mapping operations as part of a controller, processor, or state machine for each bank within a memory device.

Benefits include the ability for data operations to perform consistently despite detected failures of one or more memory die blocks and the flexibility to generate new mappings throughout the lifetime of the memory device increases the longevity of the device and the quality of service provided by the device.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110. The host system 120 can be a computing device such as a desktop computer, laptop computer, network server, mobile device, or such computing device that includes a memory and a processing device.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)). Open NAND Flash Interface (ONFI), Low Power Double Data Rate (LPDDR), or any other suitable interface. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells such as single level cells (SLCs) or multi-level cells (MLCs) (e.g., triple level cells (TLCs), quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or memory blocks that can refer to a unit of the memory component used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

The memory sub-system controller 115 can communicate with memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a mapping matrix component 113 that can (1) generate, (2) update, and (3) store one or more mapping matrices of memory die blocks to memory channels on a memory device (e.g., memory device 130, 140). For some embodiments, the mapping matrix component 113 can identify one or more corrupt, damaged, or otherwise offline memory die blocks. The data operation component 113 enables the memory system to maintain a healthy level of operating memory units to perform data operations such as read, write, and erase operations. The data operation component 113 can enable the memory sub-system 110 (via the memory sub-system controller 115) to perform operations including garbage collection operations. Further details with regards to the operations of the data operation component 113 are described below. An example of this is illustrated and described herein with respect to FIG. 2 and FIGS. 4A-4E.

Figure 2:
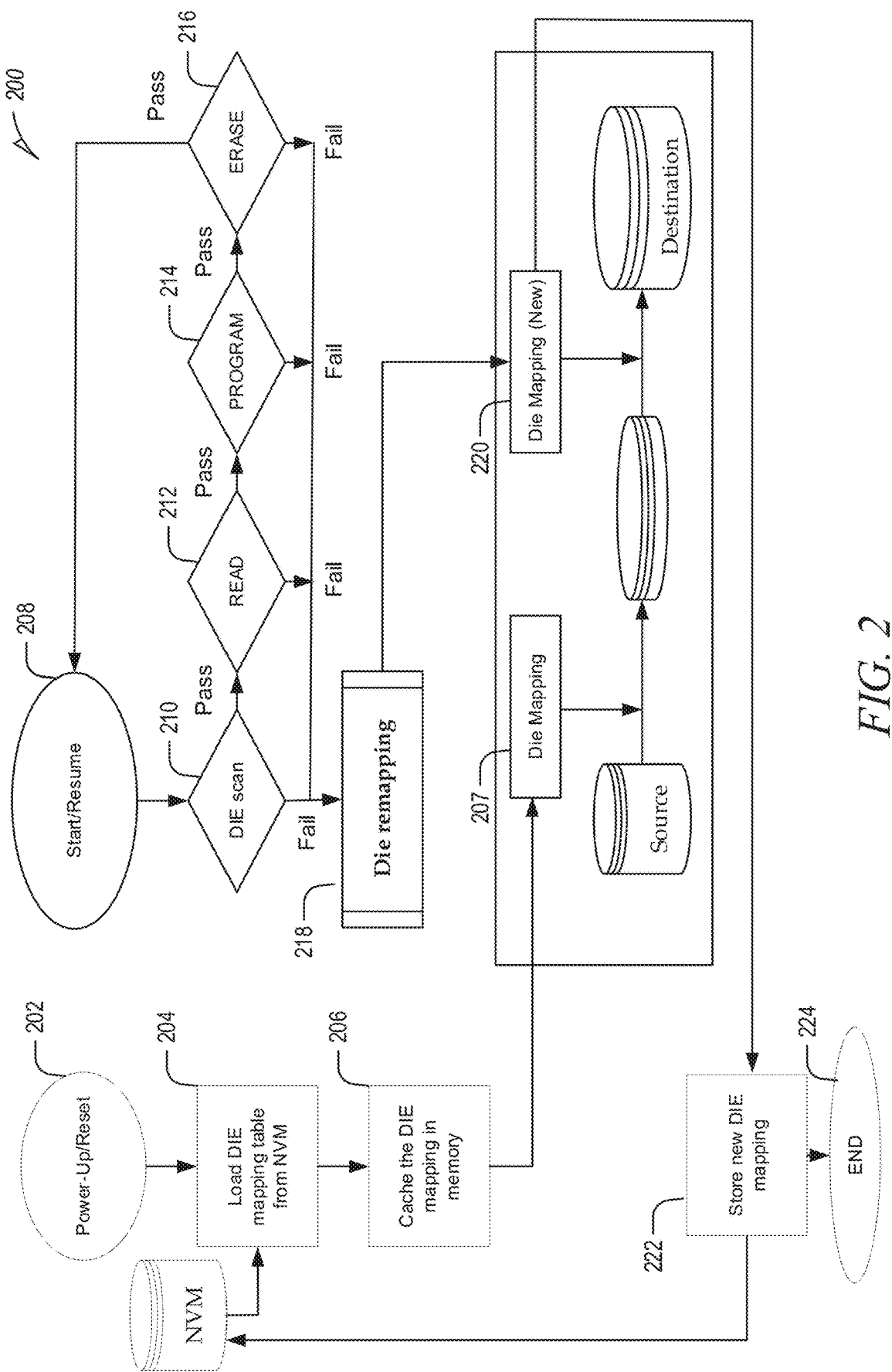
FIG. 2 is a flow diagram illustrating an example method of generating a die block mapping after a detected failure in accordance with some embodiments of the present disclosure.

FIG. 2 illustrates a flow diagram of an example method for generating die block mapping based on detection of failure of memory units in accordance with some embodiments of the present disclosure. The method 200 begins at power-up/reset when a die mapping table is loaded from the non-volatile memory (or other suitable memory storing the die swapping table) at operation 202. The die mapping table (also interchangeably referred to herein as the die mapping matrix) is cached in memory at operation 206.

When the host system requests a data operation (also referred to herein as a memory operation) to be performed, the die mapping is consulted to determine how, when, and from where the data is to be retrieved, written, or erased from. In some embodiments, prior to performing the received data operation from the host system, at operation 208, it is determined whether a new die mapping is required. At operation 210, a die scan is performed to check the health of the die blocks. In some embodiments, scans such as bad block scans are performed at power-up of the device. If the memory device passes the die scan, at operation 212 a test read operation is performed. If the test read operation is successful, the memory device passes to the next operation at 214 where a test program operation is performed. If the test program operation is successful, the memory device passes to the next operation at 216 where a test erase operation is performed. If the memory device passes all of the test operations 210 to 216, the current die mapping is used to perform the data operation from the host system. However, if in any of operations 210-216 the memory device fails, a new die mapping is generated. Failure of any of the operations 210-216 indicates a failure of a memory die block to be addressed to avoid channel collision and other unwanted errors. Details of how the new die mapping is generated is discussed with respect to FIGS. 4A-4D.

After a new die mapping is created at operation 218, the new die mapping is used to perform the data operation requested by the host. The new die mapping is stored at operation 222 in non-volatile memory or in any other suitable memory location before the method terminates at operation 224.

Figure 3:
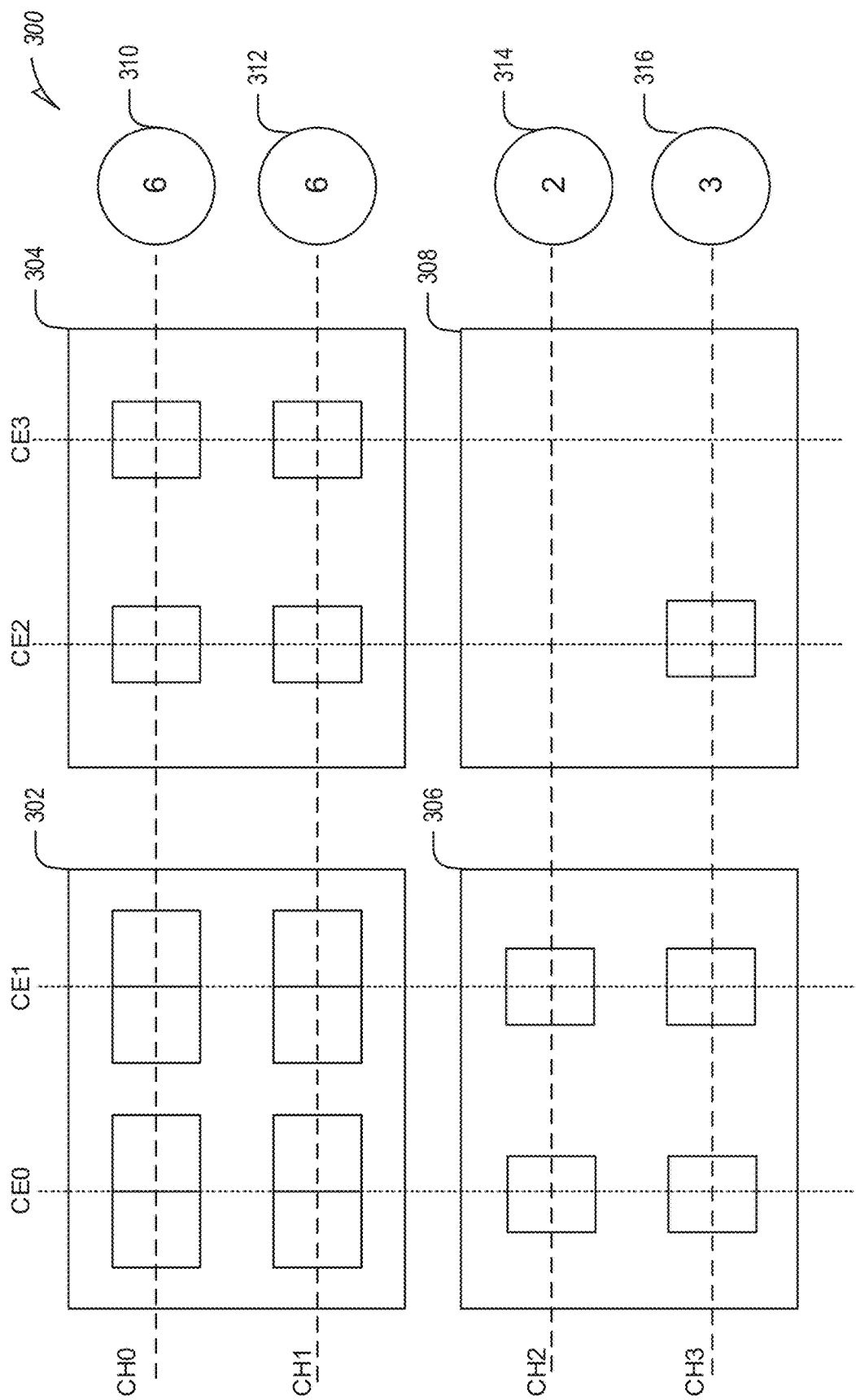
FIG. 3 illustrates a diagram of an example die block mapping on a memory device in accordance with some embodiments of the present disclosure.

FIG. 3 shows an illustration of an example group 300 of memory die blocks before a remapping has occurred in accordance with some embodiments of the present disclosure. The group 300 of memory die blocks includes die package 302 having 8 die blocks, die package 304 having 4 die blocks, die package 306 having 4 die blocks, and die package 308 having 2 die blocks. As shown for the example group, channel 0 is coupled to 4 die blocks of die package 302 and 2 die blocks of die package 304, totaling 6 die blocks indicated by indicator 310. Similarly, channel 1 is coupled to 6 total die blocks indicated by indicator 312. Channel 2 is coupled to 2 total die blocks as indicated by indicator 314 and channel 3 is coupled to 3 total die blocks as indicated by indicator 316. If any of the die blocks of the die packages connected by channels 0-3 become inoperable, the mapping of the channels to die blocks is rearranged to provide an optimal pathway of channel communication to die blocks. A channel can only service one die block at a time and servicing one block at a time becomes important to avoid the offline die block in avoiding data congestion and maintain consistent data throughput.

FIG. 4A is a graphical representation of how a new mapping is generated after detection of failure in the memory system. As shown in FIG. 3, a group of memory die packages including die blocks are coupled to memory channels. The mapping of die package/die block to memory channel is stored in a matrix format in memory. In FIG. 4A, to begin the process of generating a new mapping excluding the offline memory block, a number of die blocks coupled to each memory channel is calculated. In the example, CH0 has 6 die blocks, CH1 has 6 die blocks, CH2 has 2 die blocks, and CH3 has 3 die blocks. A sequence of channel to die block mapping is generated by following an algorithmic approach by assigning a weight to each channel and a cost to each sequential connection between channel and die block. For the generated sequence, it is more "expensive" to move to a recently assigned channel as there is an increased "fee" added to the move. The "cheapest" move is to a least recently assigned channel and/or a channel with the most die blocks. The increased fee decays after two subsequent selections. The pricing is reflected in table 404 that shows the cost to travel from one channel to another. In a case where two or more channels are assigned to a same number of die blocks, any of the channels can be selected to be the initial channel. In this example, Channel 0 and Channel 1 both are assigned to 6 die blocks. Channel 0 is selected for simplicity. From Channel 0, a path to channel 1, channel 2, and channel 3 is contemplated. Based on the table 404 that reflects the cost from a move from channel 0, channel 1 is selected as being the "cheapest" option. Channel 0 has now been added to the sequence, decreasing the number of die block assignments to 5, channel 1 has also been added to the sequence, decreasing the number of die block assignments for channel 1 to 5. From channel 1, it is determined whether to travel to channel 0, 2, or 3. The cheapest option is a tie between channels 2 and 3. Again, when the costs to travel to the next channel are the same, any choice is acceptable. The process of selecting a next channel and decreasing a die block assignment count continues until each channel has been traveled to a corresponding number of times as the number of die block assignments per channel.

In some embodiments, to finalize the channel sequence, the possibility of beginning and ending with the same channel is addressed. A check-and-swap operation is performed to finish the first step of generating the new die block mapping. The first and last channels are reviewed and if both the first and last channels of the sequence refer to the same channel, the last channel of the sequence is swapped with the second-to-last channel. In this way, the first and last channels of the sequence are distinct. From there, a check-and-swap operation is performed on the channel sequence traveling in reverse from the last channel of the sequence. After this step is complete, generating the channel sequence has been completed.

FIG. 4B is a graphical representation of a second step in generating a new die block mapping in accordance with some embodiments. After obtaining a sequence of channels in FIG. 4A, the channel sequence is mapped to a chip enable line (e.g., die block enable input) mapping. As seen in FIG. 3, each die block is mapped to one channel and one chip enable line.

To obtain the chip enable line mapping, the first channel of the sequence is identified (e.g., CH0) as well as a number of chip enable lines (e.g., CE0, CE1, CE2, and CE3, total of 4 CE lines). Starting with the first channel of the sequence, a CE line is assigned sequentially from CE0. As shown in Step 1, for each instance of CH0, a CE line is mapped, starting from CE0. In Step 2, the next channel of the sequence is identified (e.g., CH1) and the process is repeated. In Step 3, the third channel of the sequence is identified (CH3) and the mapping of CE lines to channels is continued for CH3. In Step 4, the next identified channel of the sequence (CH2) is identified and the mapping of CE lines to channels is continued in the same way. At the end of Step 4, the sequence of channels includes a corresponding CE line for each channel instance.

For example, an array is loaded with the generated channel sequence of FIG. 4A. For each channel, set the current CE as the first valid CE in the channel. For each entry in the array, if the entry is a channel, the current CE value is entered. The current CE is updated as the next valid CE which is wrapped around after the max CE is reached.

FIG. 4C a graphical representation of a third step in generating a new die block mapping in accordance with some embodiments. FIG. 4C adds a logical unit number into the channel/CE sequence to form the channel/CE/LUN sequence that forms the mapping of die blocks. Similar to the process described in FIG. 4B, each step selects a first channel sequence and adds a corresponding current LUN value until each channel/CE pairing has a corresponding LUN mapping. For example, an array is loaded with the generated channel sequence of FIG. 4B. For each CE, set the current LUN as the first valid LUN in the CE. For each entry in the array, if the entry is a channel and a CE entry, the current LUN value is entered. The current LUN is updated as the next valid LUN in the CE which is wrapped around after the max LUN is reached. The channel/CE/LUN mapping represents a mapping of die blocks 1 through 16 as identified in FIG. 3.

Figure 4D:
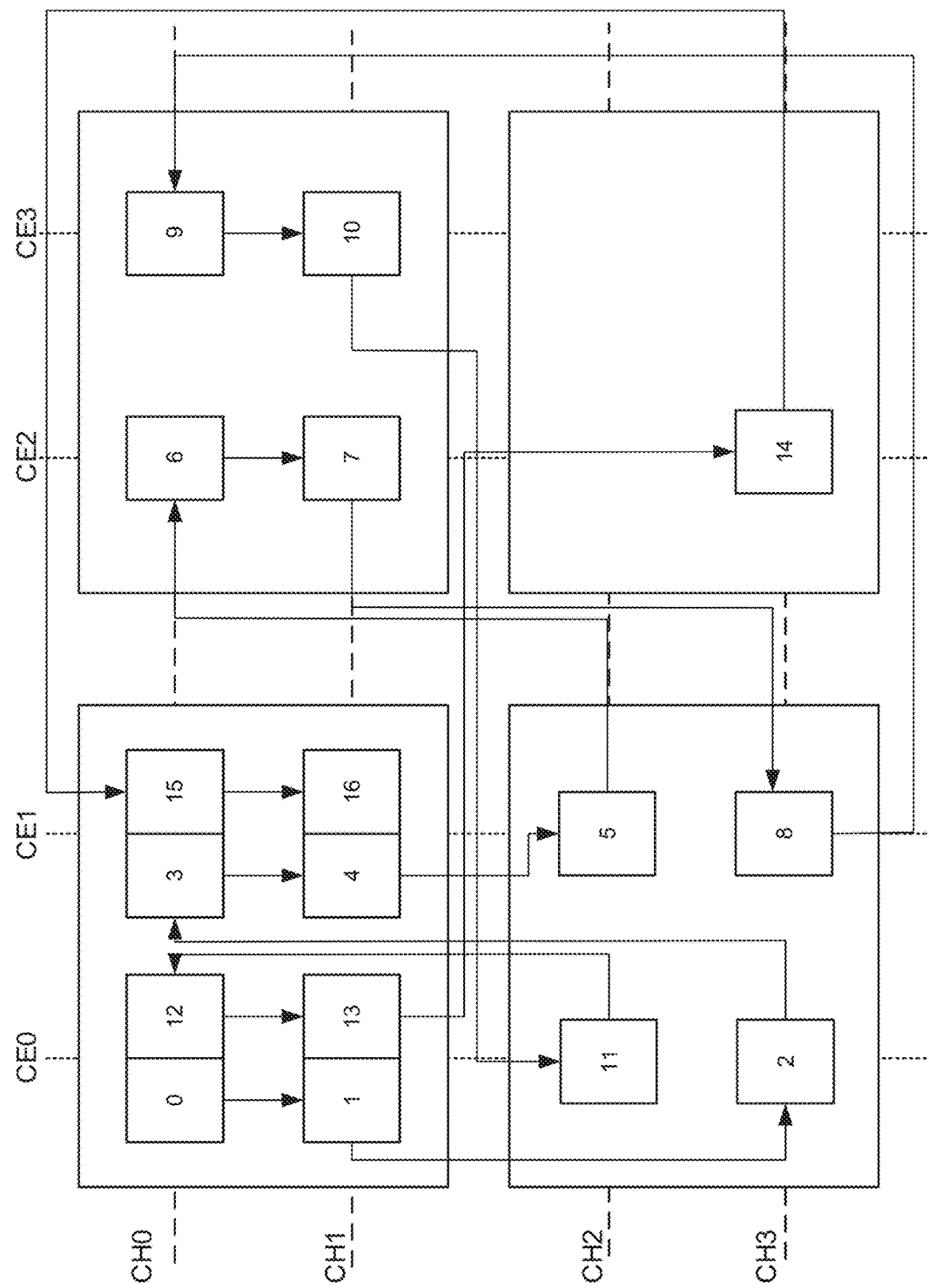

FIG. 4D shows a physical view of the channel/CE/LUN mapping for each die block. Each die block is mapped to a channel in a specific order to avoid channel collision, bus contention errors, and other failures caused when one or more die blocks spontaneously become unavailable.

Figure 4E:
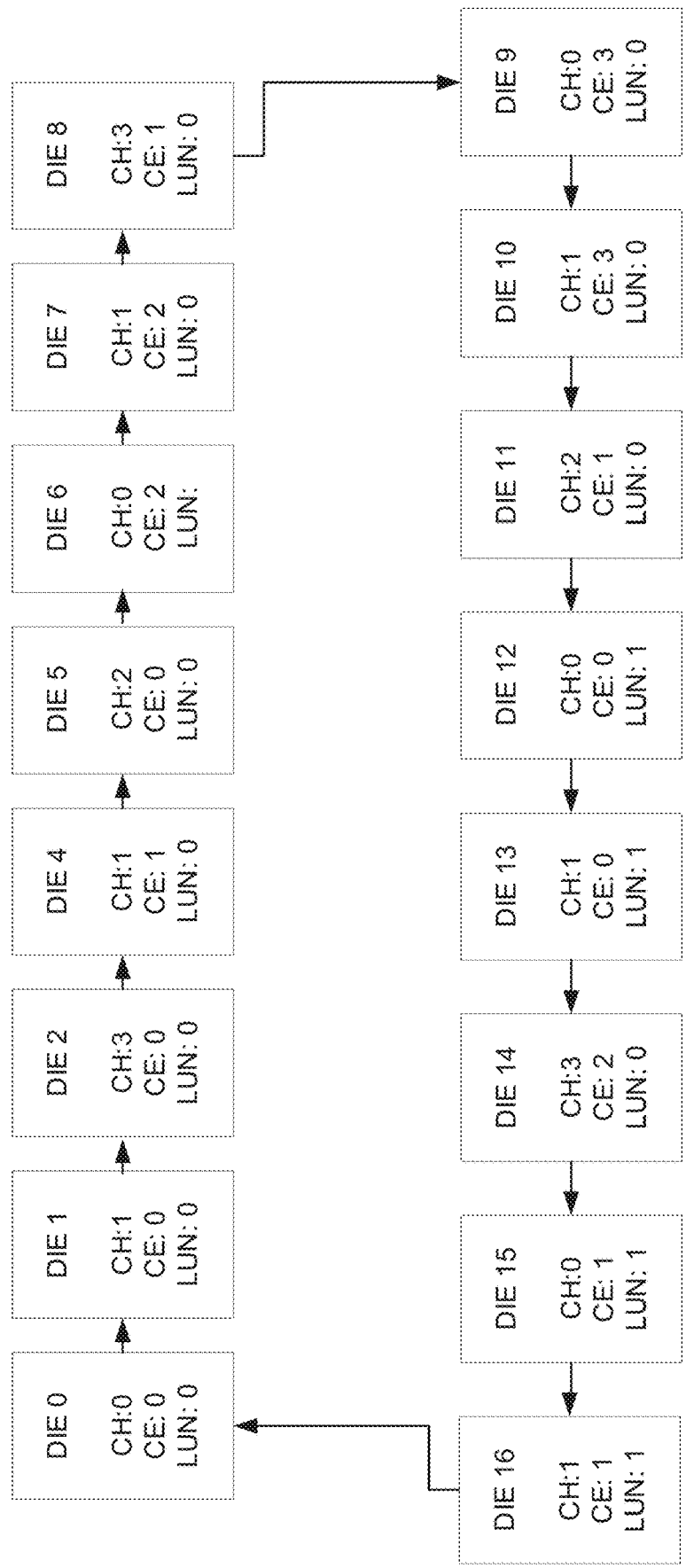

FIG. 4E shows a logical view of the new channel/CE/LUN mapping for each die block. As shown, each die block is assigned, or mapped, to a channel, CE, and LUN. Each die block is assigned once in an optimized mapping that provides stable access to the memory die blocks through the various channels and chip enable lines of the memory device.

Figure 5A:
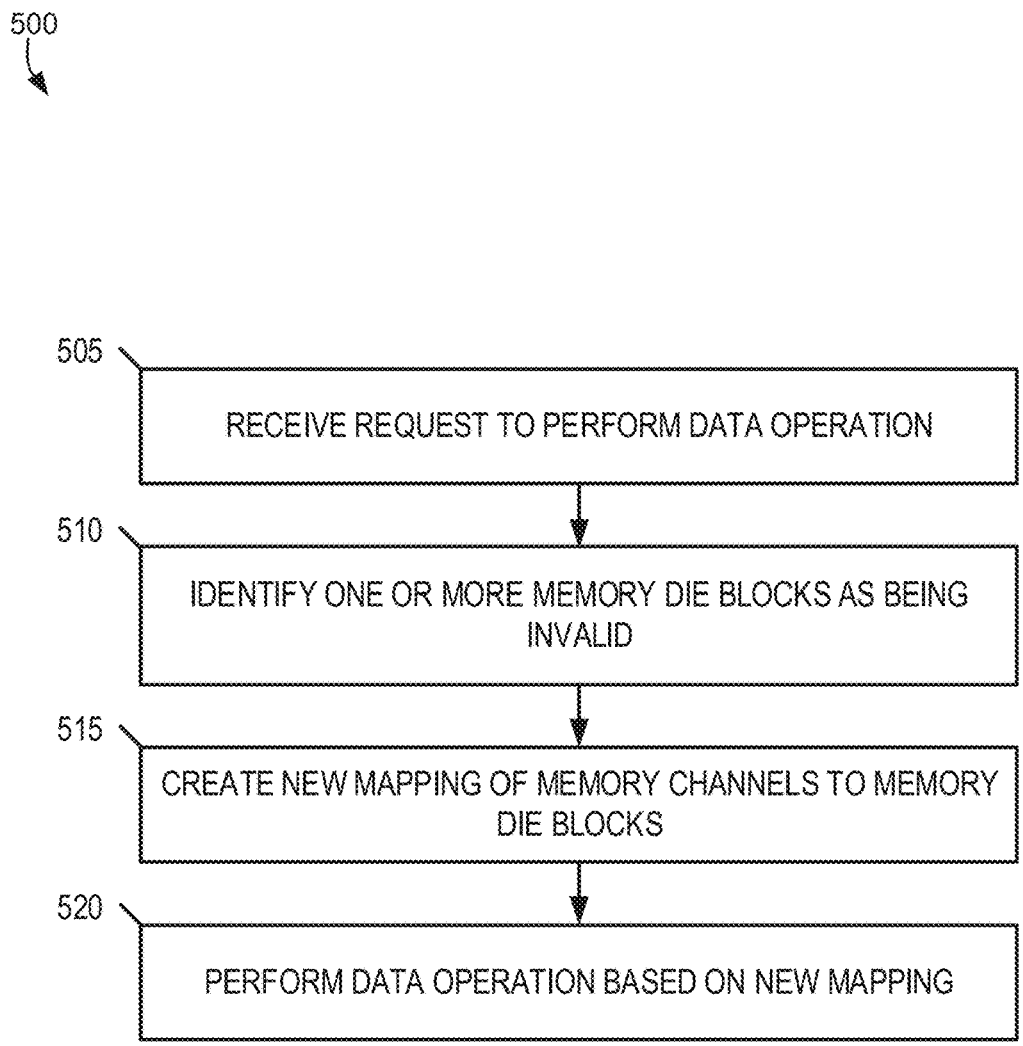
FIGS. 5A-5B illustrates a flow diagram of an example method of generating a die block mapping after a detected failure in accordance with some embodiments of the present disclosure.

FIG. 5A is a flow diagram of method 500 for generating a die block mapping after detected failure in accordance with some embodiments. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the data operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 500 of FIG. 5A, the method 500 illustrates an example of generating die block mapping after failure detection in accordance with some embodiments. At operation 505, the processing device receives a request to perform a data operation.

At operation 510, the processing device identifies one or more memory die blocks as being invalid. In some embodiments, the invalid blocks are identified by performing a memory die block scan to identify a memory die block that is offline, invalid, or corrupt. In some embodiments, any combination of a read, write, or erase operation is performed with respect to the memory device and in response to a determination that the operation failed, the processing device creates a new mapping.

At operation 515, the processing device creates a new mapping of memory channels to memory die blocks. In some embodiments, creating the new mapping of memory channels to memory die blocks includes removing the one or more memory die blocks that are identified as being invalid from the plurality of memory die blocks to be mapped. In some embodiments, one or more other memory die blocks that are identified as being unstable or at risk are also removed from the plurality of memory die blocks to be mapped.

The processing device at operation 520 performs the requested data operation based on the new mapping. In some embodiments, the requested data operation is a read, write, or an erase operation.

Figure 5B:
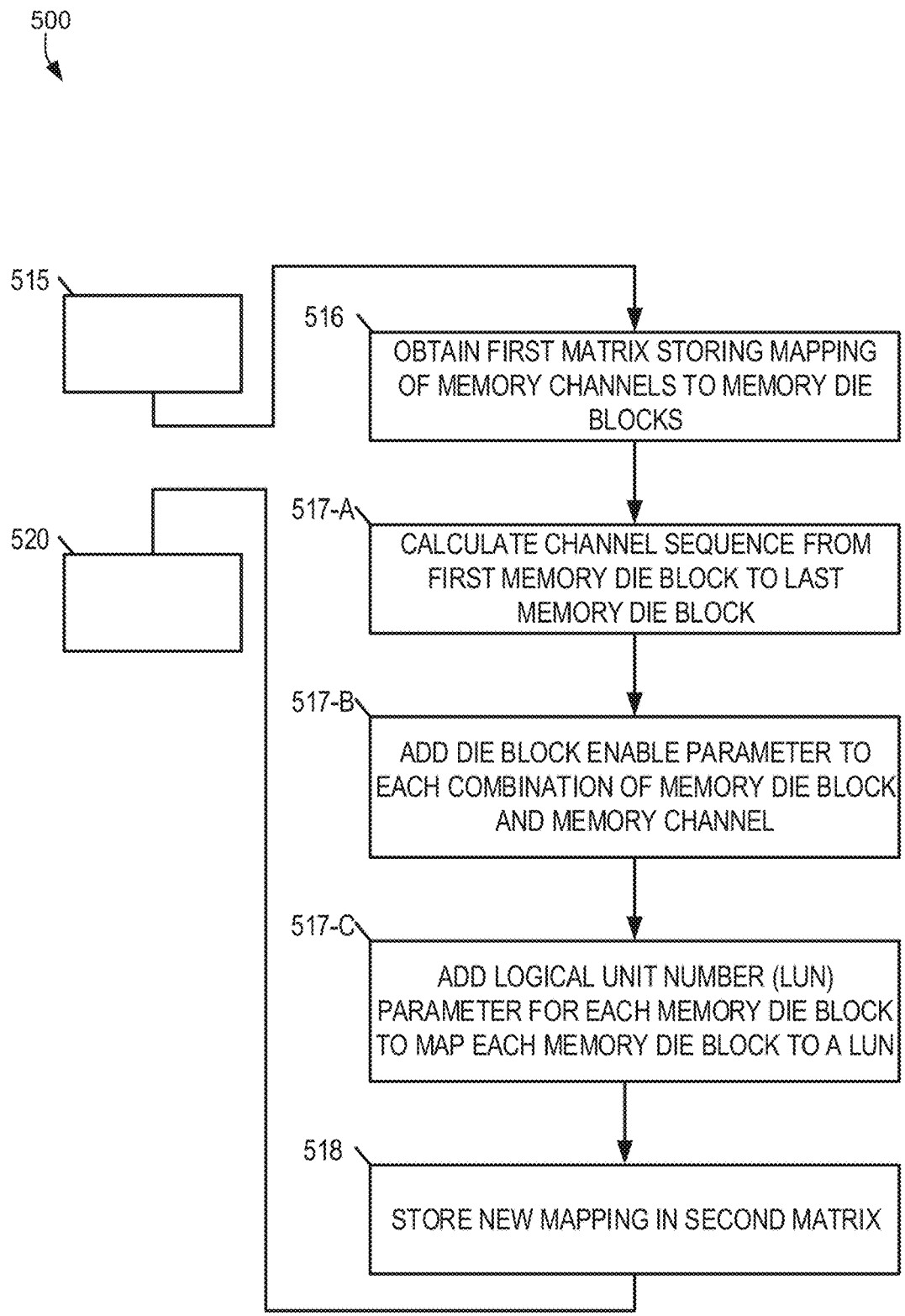

In FIG. 5B, the processing device at method 500 performs additional and/or alternative operations as shown in FIG. 5A.

The method 500 at operation 516 proceeds with the processing device obtaining a first matrix storing a mapping of memory channels to memory die blocks.

At operation 517-A, the processing device calculates a channel sequence from a first memory die block to a last memory die block. In some embodiments, a first memory channel of the plurality of memory channels is identified. The first memory channel is mapped to a highest count of memory die blocks in the first matrix. A second memory channel is selected for the channel sequence. Each memory channel has a set number of memory die blocks to map (as described in FIG. 3) and the selected second memory channel has a second lowest number of memory die blocks to map of the plurality of memory channels. After the selection of the second memory channel, the number of memory die blocks to map for the selected channel is updated to reflect a current remaining number of memory die blocks the second channel is to map to in order for the channel sequence to be completed. For example, if the selected memory channel is to be mapped to 6 different memory blocks, after the selected memory channel is entered into the second position of the memory channel sequence, the count is decreased from 6 to 5. After selection of the second memory channel, a third memory channel is selected for the channel sequence. The third memory channel having a current highest number of memory die blocks to map of the plurality of memory channels. After selection for the channel sequence, the number of memory die blocks to map for the third memory channel is updated. In some embodiments, the preceding steps are repeated until each memory die block has been assigned to a select memory channel At operation 517-B, the processing device adds die block enable parameters to each combination of memory die block and memory channel. In some embodiments, the die block enable parameter is referred to as a chip enable line (CE line). At operation 517-C, the processing device adds logical unit number (LUN) parameter for each memory die block to map each memory die block/channel/and die enable parameter to a LUN.

At operation 518, the processing device stores the new mapping in a second matrix. In some embodiments, the new mapping is stored in memory along with the original mapping.

Returning back to the operation described in FIG. 5A, at operation 520, the processing device performs data operations based on the new mapping.

Figure 6:
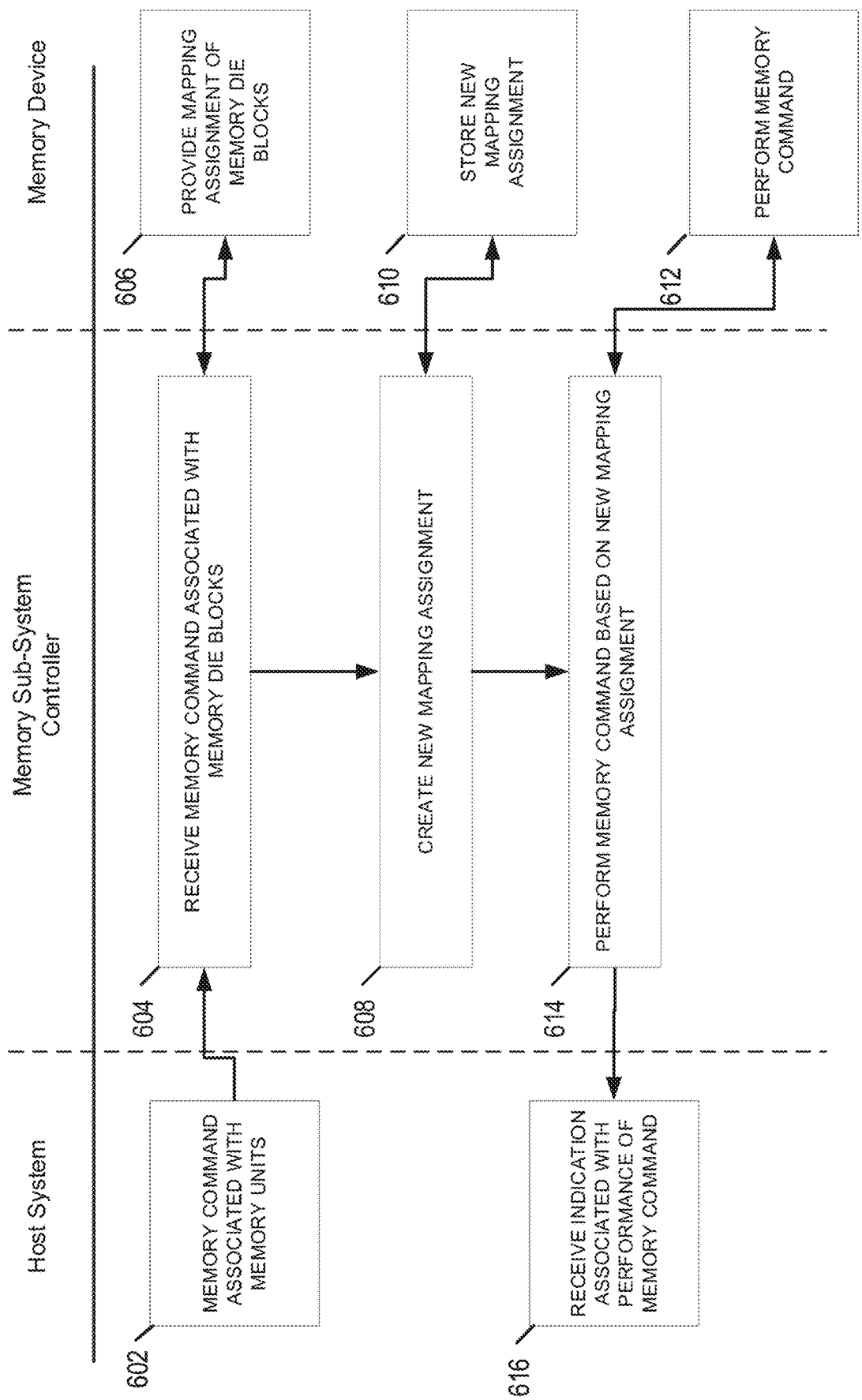
FIG. 6 illustrates an interaction diagram providing interactions between components of a computing environment in the context of some embodiments in which a method that uses die block mapping techniques on a memory device as described herein is performed.

FIG. 6 provides an interaction diagram illustrating interactions between components of a computing environment in the context of some embodiments in which a method that uses allocation techniques of data on a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system 120), a memory sub-system controller 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, and/or alternatively, one or more processes can be omitted in various embodiments. Thus, not all processes are used in every embodiment. In the context of the example illustrated in FIG. 6, the host system can include the host system 120, the memory sub-system controller can include the memory sub-system controller 115, and the memory device can include the memory device 140.

As shown in FIG. 6, at operation 602, the host system sends a memory command to the memory sub-system 110 in association with a memory unit. At operation 604, the memory sub-system controller 115 receives the memory command associated with one more memory die blocks. The memory device, at operation 606, provides a mapping assignment of memory die blocks.

In response to the memory command received at operation 604, the memory sub-system controller 115 creates a new mapping assignment. At operation 610, the new mapping assignment is stored.

The memory controller determines whether the target block is ready to be erased (e.g., if all valid data has been relocated) and erases the target block in accordance with the determination that the target block is ready to be erased (see operation 612).

In accordance with the determination at operation 612 that the memory command can be performed, at operation 614, the memory sub-system controller performs the memory command received from the host system, based on the new mapping assignment. After the memory command is performed, at operation 614, the memory sub-system controller performs and sends an indication that the memory command has been performed, which the host system receives at operation 616.

Any or all combinations of steps 602-616 can be repeated as needed in accordance with a determination that one or more memory die blocks are offline, corrupt, or unavailable.

Figure 7:
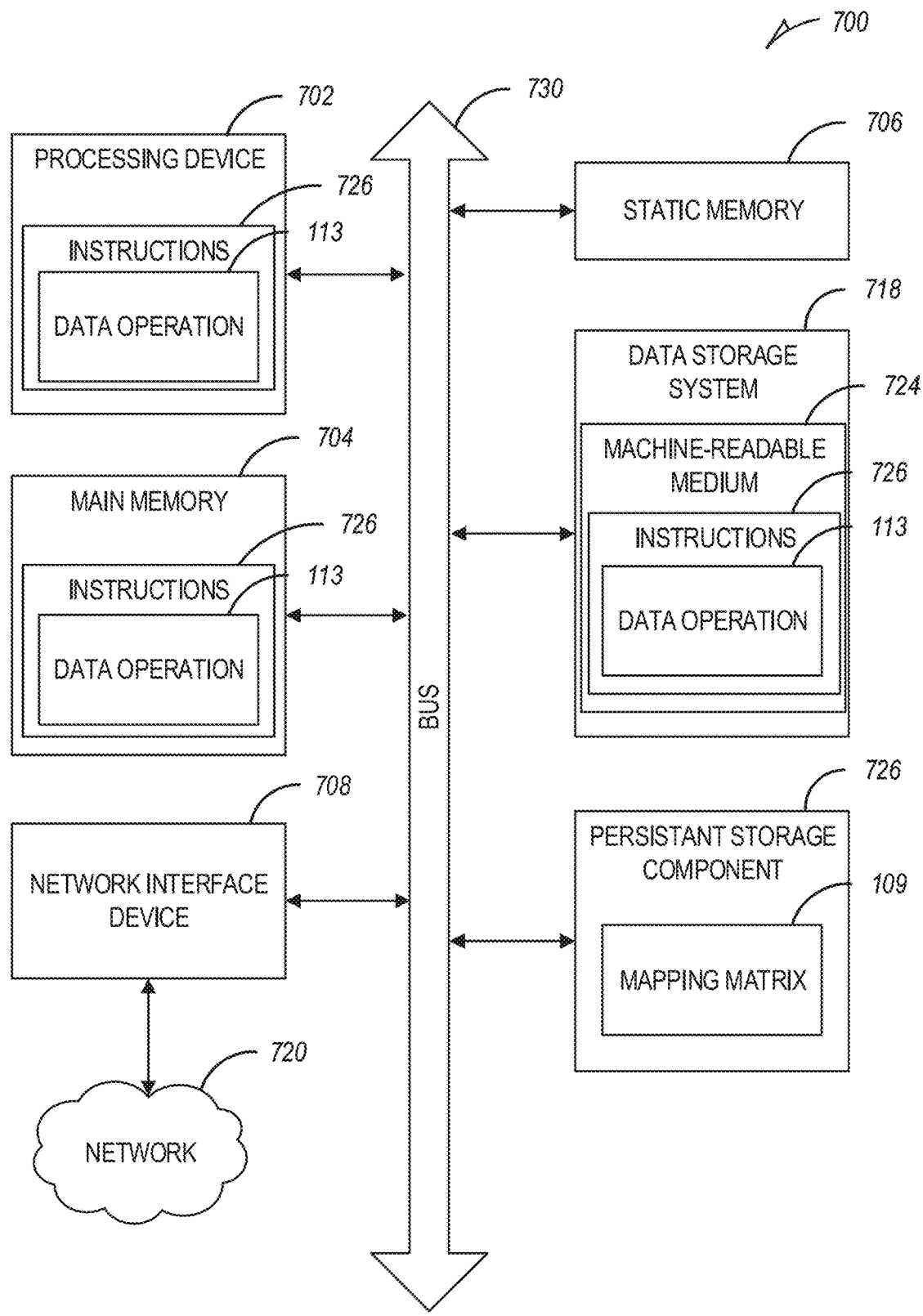
FIG. 7 is a block diagram of an example computer system in which embodiments of the present disclosure may operate.

FIG. 7 illustrates an example machine of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data operator based on data operator component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device 702 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a data operation based on valid memory count component (e.g., the data operator component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:
1. A system comprising:
   a memory device comprising a plurality of memory die blocks and a plurality of memory channels operably coupled to the plurality of memory die blocks; and
   a memory controller configured to perform operations comprising:
      identifying one or more memory die blocks of the memory device as being invalid;
      obtaining a first matrix storing a die mapping of memory channels to memory die blocks;

creating a new die mapping of memory channels to memory die blocks, the new die mapping excluding the one or more memory die blocks that are invalid, the creating of the new die mapping comprising:
generating a channel sequence that defines a specific order for assigning individual memory channel to an individual memory die block of the plurality of memory die blocks; and
generating the new die mapping based on the channel sequence;
storing the new die mapping in a second matrix; and
performing one or more operations on the one or more memory die blocks based on the new die mapping.

2. The system of claim 1, wherein the channel sequence is generated from a first memory die block to a last memory die block of the plurality of memory die blocks, and wherein the creating of the new die mapping of memory channels to memory die blocks comprises:
adding a die block enable parameter for each memory die block to map each combination of memory die block and memory channel to one of a plurality of die block enable inputs for each memory die block; and
adding a logical unit number (LUN) parameter for each memory die block to map each memory die block to a (LUN) of one or more LUNs of the memory device for each memory die block.

3. The system of claim 2, wherein the generating of the channel sequence comprises:
removing the one or more memory die blocks that are invalid from the plurality of memory die blocks to be mapped;
identifying a first memory channel of the plurality of memory channels, the first memory channel mapped to a highest count of memory die blocks in the first matrix;
selecting a second memory channel for the channel sequence, each memory channel having a number of memory die blocks to map, the second memory channel distinct from the first memory channel and the second memory channel having a second lowest number of memory die blocks to map of the plurality of memory channels; and
updating the number of memory die blocks to map for the second memory channel.

4. The system of claim 3, wherein the generating of the channel sequence comprises:
after selecting the second memory channel:
selecting a third memory channel for the channel sequence, the third memory channel having a current highest number of memory die blocks to map of the plurality of memory channels; and
updating the number of memory die blocks to map for the third memory channel.

5. The system of claim 2, wherein the generating of the channel sequence comprises:
removing the one or more memory die blocks that are invalid from the plurality of memory die blocks to be mapped; and
repeating following steps until each memory die block has been assigned to a select memory channel:
selecting an individual memory channel for the channel sequence, the individual memory channel having a lowest number of memory die blocks to map of the plurality of memory channels; and
updating the number of memory channels to map for the individual memory channel.

6. The system of claim 1, wherein the identifying the one or more memory die blocks are invalid comprises performing a memory die block scan to identify a memory die block that is at least one of offline, invalid, or corrupt.

7. The system of claim 1, wherein the operations comprise:
performing a read operation with respect to the memory device; and
in response to a determination that the read operation failed, creating the new die mapping.

8. The system of claim 1, wherein the operations comprise:
performing a write operation with respect to the memory device; and
in response to a determination that the write operation failed, creating the new die mapping.

9. The system of claim 1, wherein the operations comprise:
performing an erase operation with respect to the memory device; and
in response to a determination that the erase operation failed, creating the new die mapping.

10. A non-transitory computer readable storage medium comprising instruction that, when executed by a processing device of a memory device cause the processing device to perform operations comprising:
receiving an indication at a memory controller of the memory device that a bus contention error has occurred on a memory channel;
identifying one or more memory die blocks of the memory device are invalid;
obtaining a first matrix storing a die mapping of memory channels to memory die blocks;
creating a new die mapping of memory channels to memory die blocks, the new die mapping excluding the one or more memory die blocks that are invalid, the creating of the new die mapping comprising:
generating a channel sequence that defines a specific order for assigning individual memory channel to an individual memory die block of a plurality of memory die blocks; and
generating the new die mapping based on the channel sequence;
storing the new die mapping in a second matrix; and
performing one or more operations on the one or more memory die blocks based on the new die mapping.

11. The storage medium of claim 10, wherein the channel sequence is generated from a first memory die block to a last memory die block of the plurality of memory die blocks, and wherein the creating of the die new mapping of memory channels to memory die blocks comprises:
adding a die block enable parameter for each memory die block to map each combination of memory die block and memory channel to one of a plurality of die block enable inputs for each memory die block; and
adding a logical unit number (LUN) parameter for each memory die block to map each memory die block to a (LUN) of one or more LUNs of the memory device for each memory die block.

12. The storage medium of claim 11, wherein the generating of the channel sequence comprises:
removing the one or more memory die blocks that are invalid from the plurality of memory die blocks to be mapped;
identifying a first memory channel of a plurality of memory channels of the memory device, the first memory channel mapped to a highest count of memory die blocks in the first matrix;

selecting a second memory channel for the channel sequence, each memory channel having a number of memory die blocks to map, the second memory channel distinct from the first memory channel and the second memory channel having a lowest number of memory die blocks to map of the plurality of memory channels; and updating the number of memory die blocks to map for the second memory channel.

13. A method, comprising:

receiving a request to perform a memory operation at a memory device comprising a plurality of die blocks and a plurality of memory channels operably coupled to the plurality of memory die blocks;

identifying, at a memory controller of the memory device, one or more memory die blocks of the memory device are invalid;

obtaining a first matrix storing a die mapping of memory channels to memory die blocks;

creating a new mapping of memory channels to memory die blocks, the new die mapping excluding the one or more memory die blocks that are invalid, the creating of the new die mapping comprising:

generating a channel sequence that defines a specific order for assigning individual memory channel to an individual memory die block of the plurality of memory die blocks; and generating the new die mapping based on the channel sequence;

storing the new die mapping in a second matrix; and performing the memory operation on the one or more memory die blocks based on the new die mapping.

14. The method of claim 13, wherein the channel sequence is generated from a first memory die block to a last memory die block of the plurality of memory die blocks, and wherein the creating of the new die mapping of memory channels to memory die blocks comprises:

adding a die block enable parameter for each memory die block to map each combination of memory die block and memory channel to one of a plurality of die block enable inputs for each memory die block; and adding a logical unit number (LUN) parameter for each memory die block to map each memory die block to a (LUN) of one or more LUNs of the memory device for each memory die block.

15. The method of claim 14, wherein the generating of the channel sequence comprises:

removing the one or more memory die blocks that are invalid from the plurality of memory die blocks to be mapped;

identifying a first memory channel of the plurality of memory channels, the first memory channel mapped to a highest count of memory die blocks in the first matrix;

selecting a second memory channel for the channel sequence, each memory channel having a number of memory die blocks to map, the second memory channel distinct from the first memory channel and the second memory channel having a lowest number of memory die blocks to map of the plurality of memory channels; and updating the number of memory die blocks to map for the second memory channel.

16. The method of claim 15, wherein the generating of the channel sequence comprises:

after selecting the second memory channel:

selecting a third memory channel of the channel sequence, the third memory channel having a lowest number of memory die blocks to map of the plurality of memory channels; and updating the number of memory die blocks to map for the third memory channel.

17. The method of claim 16, wherein the generating of the channel sequence comprises repeating following steps until each memory die block has been assigned to a select memory channel:

selecting an individual memory channel for the channel sequence, the individual memory channel having a lowest number of memory die blocks to map of the plurality of memory channels; and updating the number of memory channels to map for the individual memory channel.

18. The method of claim 13, wherein the identifying of the one or more memory die blocks are invalid comprise performing a memory die block scan to identify a memory die block that is at least one of offline, invalid, or corrupt.

19. The method of claim 13, comprising:

performing a read operation or a write operation with respect to the memory device; and in response to a determination that the read or write operation failed, creating the new die mapping.

20. The method of claim 13, comprising:

performing an erase operation with respect to the memory device; and in response to a determination that the erase operation failed, creating the new die mapping.

* * * * *